March 4, 1969 R. ADLER 3,431,504

ACOUSTICAL LIGHT SIGNAL-TRANSLATING APPARATUS

Filed Aug. 10, 1964

Sheet 1 of 2

INVENTOR.
Robert Adler
BY Hugh D. Drake
Atty.

FIG. 7
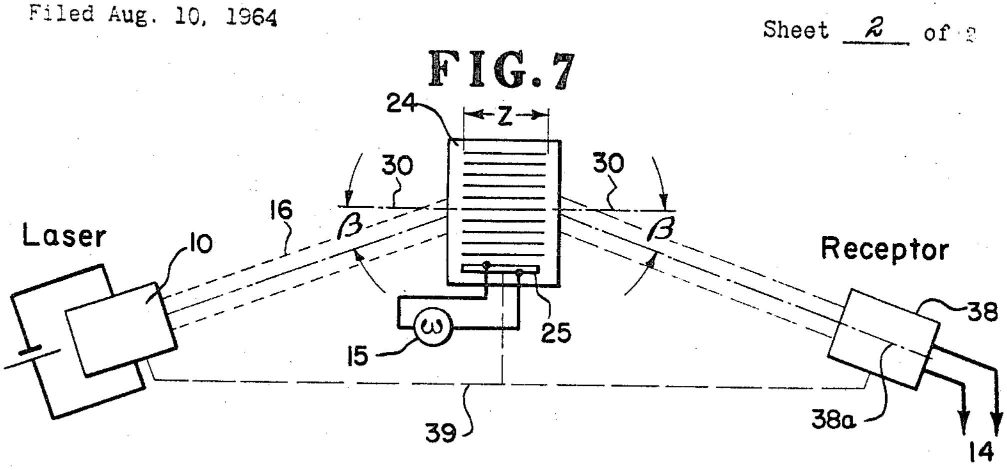
FIG. 8
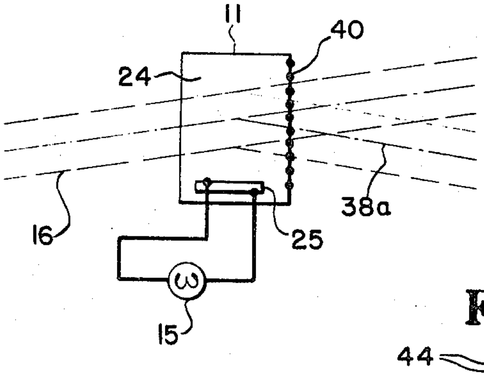
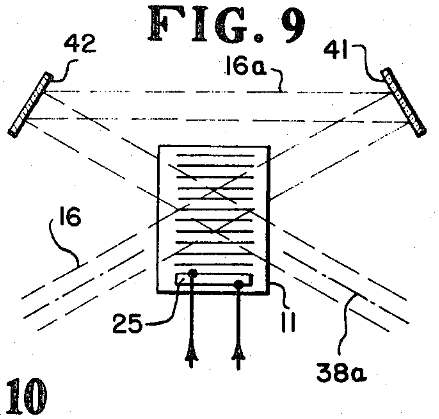
FIG. 10
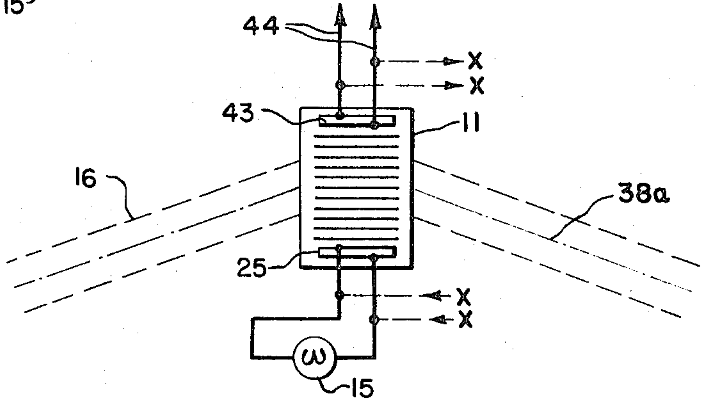
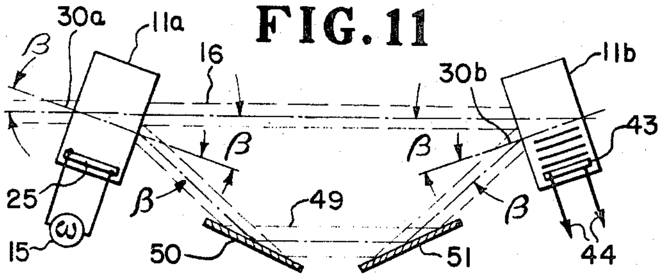
INVENTOR.
Robert Adler
BY
Hugh S. Drake
Atty.

United States Patent Office 3,431,504
Patented Mar. 4, 1969

3,431,504

ACOUSTICAL LIGHT SIGNAL-TRANSLATING APPARATUS

Robert Adler, Northfield, Ill., assignor to Zenith Radio Corporation, Chicago, Ill., a corporation of Delaware Continuation-in-part of application Ser. No. 333,549, Dec. 26, 1963. This application Aug. 10, 1964, Ser. No. 388,589
U.S. Cl. 329—129 13 Claims
Int. Cl. H03k 3/10

ABSTRACT OF THE DISCLOSURE

Acoustic waves are propagated across a light beam to diffract a portion of the light. With modulated carrier signals creating the acoustic waves, a receptor of a diffracted order of the light demodulates the carrier modulation. Adjustment of the receptor permits selection from among a plurality of different modulated carriers. A dual-receptor arrangement enables FM discrimination. Modifications permit the adaptation of homodyning techniques and the generation of acoustic signals.

The present invention pertains to signal-translating apparatus employing light as a source of wave energy. The expression "signal-translating apparatus" is used herein in a generic sense to mean a device in which wave energy is operated upon to produce one or more output signals having a predetermined characteristic which is related, but altered with respect to, the corresponding characteristic of the original signal. In this sense, the term encompasses such wave energy altering devices as are commonly designated amplifiers, detectors, harmonic generators, signal generators, oscillators, modulators and the like.

This is a continuation-in-part of an application of Robert Adler, Ser. No. 333,549, filed Dec. 26, 1963, now abandoned, entitled "A Demodulator" and assigned to the assignee of the present application. The earlier application discloses that a beam of light containing plane waves of spatially coherent monochromatic light may operate upon or interact with wave signal energy impressed upon a variable diffraction grating to produce variation in an output of the device.

Throughout the years, light beams have found utility in a variety of devices. The public, of course, is routinely familiar with such light beam devices as flashlights, spotlights, indicators and motion picture projectors. Light beams also have found use in more sophisticated environments, as in endoscopes and spectrogaphic apparatus. More recently, the development of the laser has opened the way for new applications for light energy in such diverse fields as medicine, space communications and fabrication. The typical laser beam contains a tremendous quantity of energy and yet the beam is susceptible of precise control of intensity, direction, and distance of focus to a point of operation.

Notwithstanding the aforementioned prior activity involving the use of light beams, the variety of basic device forms in the field of light remains small as compared to such fields as mechanics and electronics. It seems probable that a significantly large and fertile field remains substantially untilled.

It is accordingly a general object of the present invention to provide a light beam device which opens the way for a variety of new combinations and applications.

It is another object of the present invention to provide a light beam device which is capable of being substituted for electronic apparatus and which when used in such an environment is susceptible to system and circuit adaptation to incorporate such usual techniques as automatic frequency control, automatic volume control and the like.

It is still another object of the present invention to provide a light beam device which functions as a tunable bandpass filter for radio frequencies.

A further object of the present invention is to provide a light beam device which serves as a demodulator of wave signal energy.

A still further object of the invention is to provide a novel signal-translating apparatus which employs a light beam as an input source of wave energy.

Additionally, it is an object of the present invention to provide a light beam device of the foregoing character and which is capable of producing comparatively large amplification of signal energy.

Still additionally, it is an object of the present invention to provide a tunable amplifier of low noise characteristics capable of producing large amplification over an extended frequency range.

In a principal form of the invention, a signal-translating apparatus includes means for producing a beam containing waves of spatially coherent substantially monochromatic light. Positioned to intercept and produce a diffraction pattern from the beam is a light-sound interaction cell. Included in the cell are means for generating a modulated acoustic signal within it. The diffracted light from the cell varies in proportion to the applied acoustic signal. Means are provided for selecting a desired order of the diffraction pattern. Also provided are means for sensing variation in the light of that order.

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

FIGURE 7 is a schematic diagram of another embodiment of the invention;

FIGURE 8 is a schematic diagram of a modification of a portion of the system shown in FIGURE 7;

FIGURE 9 is a further modification of the system shown in FIGURE 7;

FIGURE 10 is a schematic diagram of a demodulator of a modulated light beam; and FIGURE 11 is a schematic diagram of still another embodiment of the invention.

Figure 1:
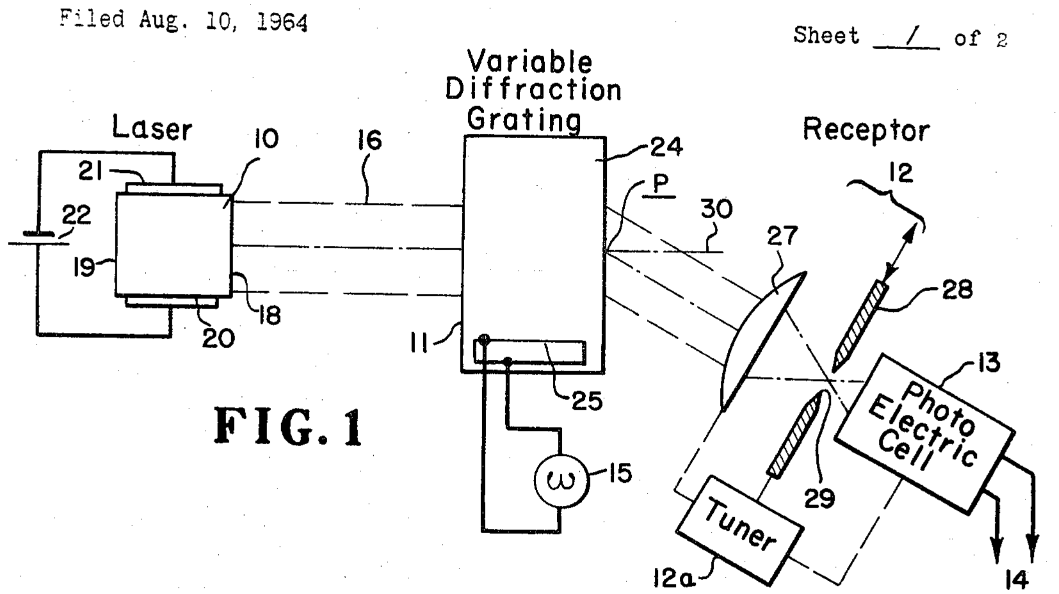
FIGURE 1 is a schematic diagram of one embodiment of the present invention.

In one basic form, the signal-translating apparatus of the invention functions as a demodulator of wave signal energy. As depicted in FIGURE 1 for purposes of illustration, the demodulator includes a laser 10, a variable diffraction grating 11, a diffraction order selector 12 and a light detector 13. In overall function, the apparatus serves to develop at terminals 14 of detector 13 audio or video signal energy contained as modulation upon a carrier, the modulated signal energy being supplied from a source 15 coupled to grating 11.

Laser 10 exemplifies means for producing a beam 16 containing plane waves of spatially coherent substantially monochromatic light which is projected into grating 11. As illustrated, laser 10 is a crystal cube having two opposing sides 18 and 19 accurately polished and with electrodes 20 and 21 secured to another pair of opposing sides. Upon application of direct current from a source 22 across electrodes 20, 21 to develop a current within the cube of high current density, an intense beam of coherent light is emitted. Suitable lasers are described in an article entitled, "Spectral Characteristics of GaAs Lasers Operating in 'Fabry-Perot' Modes," by Sorokin et al. which appeared in the September 1963 issue of the "Journal of Applied Physics," and in other articles referenced in that article. In principle, it is not necessary to utilize a laser, although its use is preferred because of the extremely high intensity of light output available in a single spatially coherent wave. For example, a beam of the required character can be obtained by passing light produced by a line filament through a narrow slit following which it is collimated by a projection lens and passed through a suitable color filter.

In this instance, variable diffraction grating 11 is of a form known as a Debye-Sears cell. It includes a medium 24 through which beam 16 is passed and which also propagates acoustic waves across the beam to create a diffraction grating corresponding to the pattern of the sound waves in the medium. The sound waves are developed by a transducer 25, such as a transverse-mode piezoelectric ceramic element immersed in the acoustic medium, across which source 15 is coupled. The acoustic or sound waves establish in medium 24 a pattern of density striations which constitute the difffraction grating for the light in beam 16. The grating constant, i.e., the number of acoustic wavelengths per unit length, is proportional to the frequency of the signal from source 15.

While, in principle, medium 24 may be any material transparent to both the light beam and the acoustic waves, typical Debye-Sears cells employ as the medium such liquids as water, benzene and carbon tetrachloride. Consequently, in practical physical form the cell takes the form of a simple container having walls preferably with a low index of refraction and in which the liquid is contained together with a sound generator or transducer 25 located near one end of the liquid volume. An additional description of the Debye-Sears cell, together with a theoretical analysis of its operation, appeared in the "Proceedings of the National Academy of Sciences," vol. 18, pp. 409–414 (1932) in an article entitled, "On the Scattering of Light by Supersonic Waves," by P. Debye and F. W. Sears. A more recent theoretical investigation of the diffraction of light by ultrasonic waves is reported in an article entitled, "Optical Effects of Ultrasonic Waves Producing Phase and Amplitude Modulation," by L. E. Hargrove and which appeared in the "Journal of the Acoustical Society of America" for October 1962.

While under some circumstances it may be necessary to provide a sound attenuator at the inner surface of cell 11 opposite tranducer 25 to prevent interference by reflected sound waves from the opposite wall of the cell, in the normal situation it has been found that the attenuation of sound by medium 24 is sufficient to prevent such interference.

A variety of light patterns may emerge from diffraction grating 11. As will be discussed more fully below, the diffraction angle is a function of the wavelengths and propagation velocities involved. Further, the light pattern which emerges for each given set of conditions is distributed among a number of angles referred to in the art as "orders." The zero order represents that portion of the light which passes straight through gating 11, while the successively higher orders (1, 2, 3, etc.,) appear symmetrically to either side of the zero order.

Selector 12 is positioned to be receptive to light of an order other than the zero order. As illustrated, it takes the form of a convergent lens 27 followed by a slit-defining barrier 28 having its aperture or slit 29 disposed approximately at the focus of lens 27. While the opening in barrier 28 may in fact be a circular hole, its function in well-understood optics terminology is that of a "slit." The light passing through slit 29 impinges upon detector 13 which responds thereto to provide an output signal at terminals 14 representing the intensity of the impinging light. Detector 13 in its simplest form is merely a photoelectric cell. By means of tuner **12*a*, barrier 28 and photo cell 13 may be shifted laterally relative to lens 27. Alternatively, tuner 12*a* operates to pivot the entire assembly of selector 12 and photo cell 13 about a line P across the middle of the light emerging from cell 11. Collectively selector 12, photocell 13 and tuner 12*a* may be considered a receptor for receiving and sensing part of the wave signal energy output from grating 11**.

In operation, for a given frequency of the carrier signal from source 15, the desired order may be detected only with selector 12 positioned at a given angle relative to the normal 30 to grating 11. Tuner **12*a* is used to adjust the relative position of selector 12 to respond to the desired order. For a preferred order, tuner 12*a* is also used to adjust, usually more finely, the relative position in order to select and detect a particular carrier frequency. For example, a lateral shift of slit 29, together if necessary with detector 13 but with lens 27 standing still, permits the detection of different carrier frequencies within a given order; the width of the accepted passband is a function of the width or size of slit 29. Within a given order, variation of the angular tilt of selector 12 and detector 13 away from normal 30 permits an alternative or further selection and detection from among a range of carrier frequencies applied from source 15. Consequently, when source 15 supplies a plurality of different carrier frequencies, as for example a plurality of successive television channels, adjustment of the position of selector 12 relative to grating 11** enables the apparatus to be tuned selectively to a desired carrier frequency or channel. In substance, then, the device is both a tunable bandpass filter and a demodulator. Of course, adjustment of the relative selector position to detect from among a wide range of one group of frequencies can at the same time select and detect from another order of a different group of frequencies.

Figures 2, 3, 4, 6:
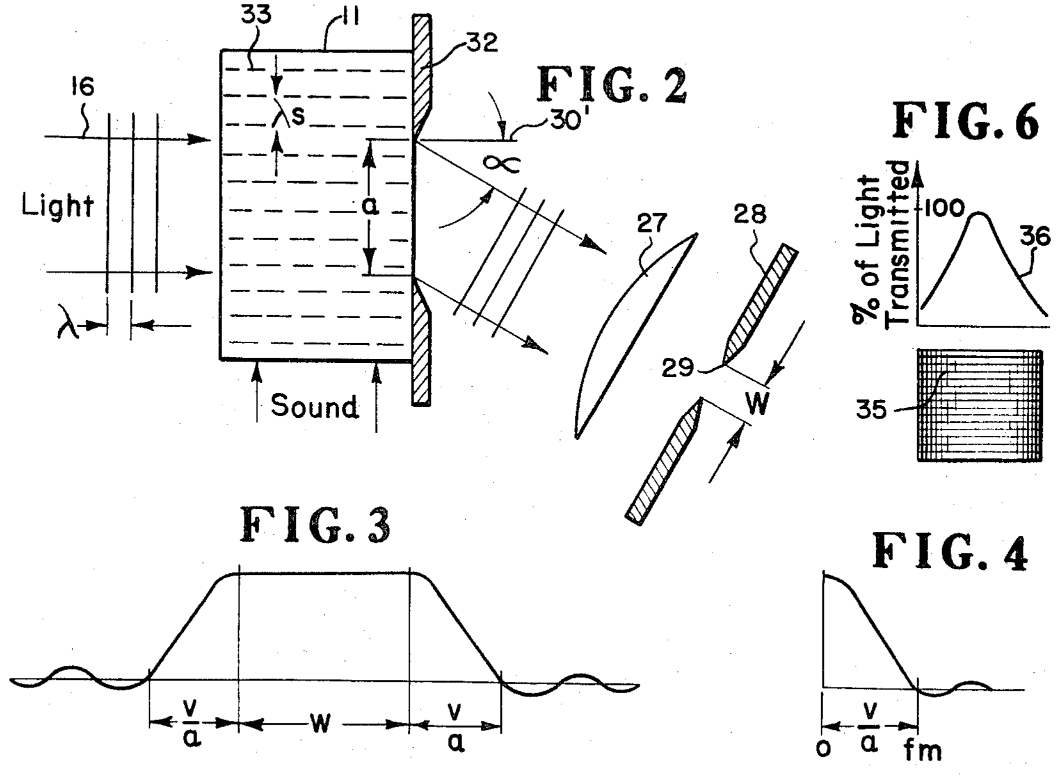
FIGURE 2 is a more detailed diagram of a portion of the embodiment of FIGURE 1.
FIGURES 3 and 4 are graphical representations helpful in understanding the operational characteristics of the system shown in FIGURE 1.
FIGURE 6 is a front view of a filter which may use with the embodiment of FIGURE 1, an intensity distribution curve of the filter also being depicted.

To understand the operational characteristics in more detail, it will be helpful to refer to FIGURE 2 which schematically depicts the function of grating 11 and slit 29. As shown, the latter has a width W and the diffracted light waves have a diffraction angle $\alpha$. The width of the diverging light waves is limited by a mask 32 to a width or distance $a$. As $\alpha$ is a small angle the beam width and the aperture width may both be taken to be $a$. As indicated by the dashed wavefronts or striations 33 within grating 11, the sound waves have a wavelength $\lambda_s$. The light waves have a wavelength of $\lambda$.

Preferably, the amplitude of the sound waves is within a range in which the field intensity or amplitude of the diffracted light remains approximately proportional to the signal amplitude developed by transducer 25. It can be shown that the sine of diffraction angle $\alpha$ is proportional to the carrier frequency of the acoustic waves. The fundamental expression for the diffraction relationship is:

$$\lambda_s \sin \alpha_n = n\lambda \qquad (1)$$

where $n$ is an integer denoting the order of the diffracted light pattern; $n$ is zero for the zero order. A maximum of light intensity exists for each angle $\alpha_n$ which is a solution of Equation 1. For angles which depart somewhat from the precise value of $\alpha_n$, in either direction, light intensity decreases. For a beam width $a$, the first null on each side of the optimum angle $\alpha_n$ is reached at an angle $\alpha_{(o)}$ in accordance with the relationship:

$$a \sin \alpha_{(o)} = a \sin \alpha_n \pm \lambda \qquad (2)$$

An examination of typical numerical values is instructive. Assuming water as the medium 24 in diffraction grating 11, the velocity *v* of sound is approximately 1500 meters per second. Consequently, for a modulation frequency of 5 megacycles, the maximum width of aperture *a* is 0.3 millimeter. For a frequency limit of 3 megacycles, the width of aperture *a* becomes 0.5 millimeter and this in turn indicates a 6 megacycle spacing between the nulls of the diffraction pattern. On the other hand, for only a 10 kilocycle post-detection bandwidth, the width of aperture *a* may be as much as 15 centimeters; and for a 100 kilocycle post-detection bandwidth, the width of the aperture may be 1.5 centimeters. It will be noted that these are entirely practical dimensions.

Figure 5:
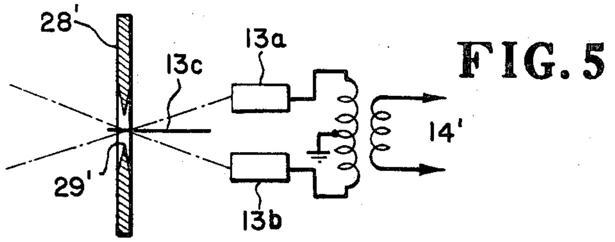
FIGURE 5 is a diagram of an alternative to a portion of the system shown in FIGURE 1.

FIGURE 5 illustrates an alternative form of the selector and detection means of FIGURE 1. In this instance, slit 29' is divided into two separate halves by a double-sided mirror **13*c*; two photocells, 13*a* and 13*b*, are disposed behind slit 29', one on each side of mirror 13*c*. The two photocells are connected in push-pull so as to provide a combined output at terminals 14'**. The overall function of the system as modified by FIGURE 5 is that of a frequency-modulation receiver. The two adjacent photocells whose output currents are combined in push-pull constitute an FM discriminator. Otherwise, the operation is in accordance with the same principles as discussed above for FIGURE 1 in which amplitude modulation was assumed.

As thus far described, the FM receiver embodiment of FIGURE 5 is a demodulator of the type corresponding to a discriminator without a limiter. It is also contemplated to arrange the FIGURE 5 device so as to inherently effect limiting of the detected signal as well. To this end, two photoconductive cells **13*a* and 13*b*** are operated from a high-resistance common source, such as a constant-current power supply. With a minimum of light available to develop a predetermined minimum current from the constant-current source, the current itself will remain unchanged with changes of light intensity. However, the ratio of the two photo-currents will correspond to the ratio of the light intensities detected by the two photocells. With the two output currents combined in push-pull as illustrated, the output signal is a function only of signal frequency and not of amplitude, as long as the light intensity is above the photocurrent threshold. Consequently, operation in this manner is that of a limiter-discriminator combination or of a ratio detector.

In summary, the embodiments of the invention discussed thus far disclose a demodulator system suitable for use either with amplitude or frequency modulation. As shown, the system operates entirely with sound and light waves. It offers a large degree of flexibility in materials and arrangement and affords the capability of handling either wide or narrow bandwidth signals with predeterminable selectivity. In use, the system also constitutes a tunable bandpass filter.

Still further flexibility in the capabilities of the system may be had by the use of an acoustic amplifier as part of transducer 25 to increase the input sensitivity. Such amplifiers for ultrasonic frequencies are typified by the use of a piezoelectric semi-conductor material such as cadmium sulphide, to which a unidirectional voltage is applied. Amplifiers of this kind are known in which the piezoelectric semi-conductor material is not only preceded by an input transducer but also followed by an output transducer, so that the amplified acoustic waves are finally converted into an electrical output signal. In connection with the present invention, no output transducer is used; instead, the amplified acoustic energy is delivered directly to medium 24.

The signal-translating system of the invention is capable of operating at high gain levels. The principal gain-determining parameter is the intensity of light beam 16. As is known, such devices as lasers are capable of providing light beams having high power levels. Consequently, while source 15 may represent a singal of extremely small intensity, causing only a small fraction of the incident light to be diffracted into selector 12, the amplification of the system is limited only by the intensity of the incident light beam and the capability of detector 13 to convert light energy efficiently into electrical energy or to otherwise efficiently utilize the selected light energy.

In FIGURE 7, laser light source 10, variable diffraction grating 11 and a receptor 38 are mechanically interconnected by an orientation coordinating device 39. Light source 10 and light-sound interaction cell are structurally similar to the corresponding apparatus of FIGURE 1. Receptor 38 is identical in structure to selector 12 and photocell 13 of FIGURE 1, although it may comprise other means for sensing incident light. It is positioned on a primary axis **38*a*** along which travels the light it senses.

In overall function, light source 10 generates and directs light beam 16 into cell 11 from which at least part of the beam is diffracted and sensed by receptor 38. Receptor 38 translates the sensed light into an electrical output at terminals 14. As in the previously described embodiments, the diffraction of cell 11 is produced by and varies in proportion to an acoustic signal generated in medium 24 by transducer 25 in response to the input electric signal from source 15 which may be a modulated carrier signal.

Device 39 need only be a simple mechanical bar-link and pivot assembly which maintains light source 10 and receptor 38 oriented toward cell 11 and maintains the angle $\beta$ between beam 16 and the normal 30 to the surface of cell 11 equal to the angle between axis **38*a* and the normal 30. As so constructed device 39 serves to maintain the wave fronts of the acoustic waves generated by transducer 25 directed across the path of beam 16 at the selected angle. Device 39, which constitutes tuning means in a manner analogous to tuner 12*a* of FIGURE 1, is adjustable so as to vary the angle $\beta$ through a range of values while maintaining the described orientation and position relationship between light source 10, cell 11 and receptor 38**.

In this embodiment, beam 16 enters cell 11 at an oblique angle. When angle $\beta$, known as the Bragg angle, satisfies the following condition:

$$\sin\beta = \pm\frac{1}{2}\frac{\lambda}{\lambda_s} \approx \beta \tag{14}$$

light is diffracted from cell 24 at the same angle $\beta$ from normal **30*a*. The plus or minus sign, in relationship to cell 11**, can be taken to represent angular direction respectively below or above the normal line. That is, the plus or minus sign indicates that Bragg diffraction can be obtained at an angle $\beta$ below the normal line or above the normal line.

As noted in "Kilomegacycle Ultrasonics" by Klaus Dransfeld, vol. 280, No. 6 of Scientific American (June, 1963) at pages 60–68, the diffraction pattern produced by projecting monochromatic light at right angles to sound waves in the medium of conventional DeBye-Sears cell does not appear when the sound is at sufficiently high frequencies, e.g. 1000 mc. At these high frequencies, the light passes directly through the sound cell. Under such conditions in order to obtain diffraction of the light it is necessary to direct the incident light at a particular angle to the sound waves. This angle is analogous to the angle observed in crystal X-ray diffraction and is conventionally termed the Bragg refraction angle.

The difference between the two types of diffraction and their relationship to the frequency of the impressed sound signal is shown qualitatively in the Dransfeld article. It is also known that the diffraction phenomenon used in the device of FIGURE 1 is related not only to the wave lengths of the sound and light but also, additionally, to the width of the sound wave fronts. The maximum sound wave front width $Z_{max}$ capable of producing a diffraction and the change in angle $\Delta\alpha$ required to change from maximum to null is:

$$\alpha_{(o)}-\alpha_n=\Delta\alpha=\pm\frac{\lambda}{a\cos\alpha_n} \quad (3)$$

For most practical apparatus, the diffraction angle will be small, as a result of which cos $\alpha_n$ approaches 1. Consequently, Equation 3 may be rewritten as:

$$\Delta\alpha=\pm\frac{\lambda}{a} \quad (4)$$

Further, for the small diffraction angles usually encountered, sin $\alpha_n$ approaches the number of radians in the angle $\alpha_n$ and Equations 1, 2, and 4 yield the relationship:

$$\frac{\Delta\alpha}{\alpha_n}=\pm\frac{\lambda s}{na} \quad (5)$$

Specifically, for the first order diffraction pattern $$\frac{\Delta\alpha}{\alpha_1}=\pm\frac{\lambda s}{a}=\pm\frac{1}{N} \quad (6)$$

where N is the number of sound wavelengths within the aperture or beam width $a$.

The foregoing analysis pertains to sustained single-frequency signals. It shows that when such signals are employed to produce sound waves in device 11, photoelectric cell 13 receives substantial light only within certain ranges of angles given by $\alpha_n\pm\Delta\alpha$. Since $\alpha_n$ depends on the wavelength of the sound and hence on the frequency of the signal source, the photocell receives light only when the signal frequency is within a predetermined range. Specifically, for small angles $\alpha_n$, Equation 1 can be rewritten as $$\lambda_s\alpha_n=n\lambda \quad (7)$$

or $$\alpha_n=\frac{n\lambda}{\lambda s}=\frac{n\lambda}{v}f \quad (8)$$

where $v$ is the velocity of sound in the liquid and $f$ is the signal frequency. For a change $\Delta f$ in signal frequency, the angle $\alpha_n$ must change by $$\Delta\alpha=\frac{n\lambda}{v}\Delta f \quad (9)$$

For a frequency change just large enough to reduce the light to zero, Equation 9 must be equal to Equation 4:

$$\Delta\alpha=\frac{n\lambda}{v}\Delta f=\pm\frac{\lambda}{a};\ \Delta f=\pm\frac{v}{na} \quad (10)$$

Equation 10 gives the selectivity for sustained signals of varying frequency, assuming a slit 29 of negligible width. Widening of this slit, of course, results in the acceptance by detector 13 of a definite range of angles $\alpha_n$ and a corresponding additional range of signal frequencies.

In practice, the operation usually is concerned with modulated signals. Because of the slow propagation velocity $v$ of sound, a wide aperture dimension $a$ may contain many peaks and valleys of the modulation envelope, as a result of which the modulation in the light received by photocell 13 is averaged out. For a modulation frequency $f_m$, an envelope wavelength $\lambda_m$ is defined by the expression:

$$\lambda_m=v/f_m \quad (11)$$

The lowest modulation frequency for which averaging-out or cancellation occurs is that which renders $\lambda_m=a$, or $f_m=v/a$. Thus, an aperture or beam width $a$ limits the range of useable modulation frequencies to those smaller than $v/a$:

$$f_m\leqq v/a \quad (12)$$

Viewed in another way, the aperture width $a$ must not exceed a given maximum if modulation frequencies up to $f_m$ are to be reproduced; the condition is $$a\leqq v/f_m \quad (13)$$

A relationship exists between this condition and the system response to sustained signals previously treated. A carrier frequency signal modulated by a frequency which may go as high as $f_m$ requires at least a bandwidth $\Delta f=f_m$. The bandwidth for sustained signals, for negligible width of slit 29, was given in Equation 10 as $$\Delta f=\pm\frac{v}{na}$$

For the first order ($n=1$), $\Delta f$ thus is inherently equal to $f_m$.

To recapitulate, a straight-edged aperture $a$ with uniform intensity distribution produces a diffraction pattern lobe with an intensity distribution such that the first nulls are spaced in accordance with the relationship $$\Delta f=\pm\frac{v}{na} \quad (10)$$

Because of the presence of different modulation phases within the aperture, the maximum modulation frequency $f_m$ is expressed by the equation $$f_m\leqq v/a \quad (12)$$

Thus, for the first order and for a zero-width photocell slit 29, the conditions for selectivity and bandwidth coalesce. When, however, slit 29 is made wider, the range of frequencies or the bandwidth is increased proportionately. Nevertheless, the highest modulation frequency is still expressed by Equation 10. Consequently, the use of a wide photocell slit 29 renders the system similar in its action to that of a radio receiver having a wide predetection bandwidth but a much narrower post-detection bandwidth; analogous operation is often found in vary-high-frequency voice communication receivers. This condition is illustrated in FIGURES 3 and 4. FIGURE 3 depicts the predetection bandwidth in which the central or flat-topped portion has a width corresponding to the width W of slit 29.

FIGURE 4 illustrates the post-detection band from modulation of zero frequency up to the highest modulation frequency $f_m$. It should be noted that its width depends only upon the sound velocity $v$ and the width $a$ of the aperture; it is not a function of the slit width W. With a first-order diffraction pattern it is not possible to obtain cutoffs in the predetection band which are sharper than the post-detection band; with higher orders ($n>1$) this is possible.

In the interest of simplicity, straight parallel edges and uniform illumination have been assumed for beam aperture $a$ and photocell slit W. These assumptions produce curves of the type illustrated in FIGURE 4, characterized by a succession of nulls separated by minor peaks. These patterns are identical with the directivity patterns produced by large antennas having uniform current distribution throughout their aperture. Modifications of the intensity distribution are well known which reduce or avoid the multiple minor peaks; these are characterized by a gradual tapering off of intensity near the edges of the aperture. For instance, a Gaussian distribution of intensity within the aperture produces a Gaussian directivity pattern having no nulls or minor peaks, but rather exhibiting a monotonic decrease of intensity on both sides of the central maximum response. It is within the scope of this invention to modify the distribution of light within aperture $a$, by choice of the light source, shaping of the aperture edges or by providing absorbing, refracting or similar means, so as to obtain desirable response curves. For example, FIGURE 6 depicts a filter 35 having a graded transmissivity across its width, maximum transmission being at the center as indicated by curve 36. Filter 35 may simply be placed across aperture $a$ with an orientation to vary the transmission across the light pattern in the direction of diffraction. Analogous considerations apply to the control of selectivity characteristics by providing similar means to modify the transmission of light through slit 29.

pattern of useful magnitude in a device exemplified by FIGURE 1 is given by the formula $$Z_{max}=\lambda s^2/4\lambda \quad (15)$$

As the wave length of the sound becomes shorter, the useable wave front width $Z_{max}$ becomes smaller. While it is possible to obtain diffraction patterns at the kilomegacycle frequencies with the device shown in FIGURE 1, the maximum useable wave front width is impractically small for many applications. For example, with a HeNe laser light source and 1000 mc. sound in a sound cell medium of rutile, $Z_{max}$ becomes equal to 0.003 of an inch. Even for frequencies in the megacycle range, $Z_{max}$ may be inconveniently small. For example, with a 50 mc. signal in water with the same light source $Z_{max}$ becomes 0.02 inch. For most applications such a small $Z_{max}$ makes it desirable to use Bragg diffraction.

The use of Bragg angle diffraction as shown in the embodiment of FIGURE 7 has the advantage of permitting the efficient use of a sound wave front of unlimited width, thus achieving much greater efficiency in the transfer of light energy to receptor 38. The power contained in the light wave is proportional to the square of its amplitude. Virtually the entire light energy of beam 16 may be diffracted by cell 11 by a large enough signal from source 15. Bragg angle diffraction is best suited for operation at very high frequencies (VHF) and ultra-high frequencies (UHF).

With $E_1$ representing the amplitude of the incident light beam 16, the light amplitude $E_r$ diffracted from cell 11 is expressed approximately by the following formula:

$$E_r=E_1 \sin \frac{1}{2}\left(K_o \frac{\Delta n}{n_o}\right) Z \quad (16)$$

where $K_o$ is the propagation constant for light in the medium as given by the formula $K_o=2\pi/\lambda$, $n_o$ is the normal, unperturbed, refractive index of medium 24 (equal to the velocity of light in vacuum divided by the velocity of light, of wave length $\lambda$, in the medium), $\Delta n$ is the maximum change in the diffraction index that results from the pressure stratifications caused by the sound waves generated in medium 24, and Z is the effective width of the plane sound-wave fronts.

As can be seen from this formula, the amplitude of the diffracted light at the Bragg angle, for a given monochromatic light source strength, depends on the relative strength of the signal source 15 (as represented by $\Delta n$) and on the effective width of the plane sound-wave fronts. The corresponding expression for the undiffracted light intensity $E_u$ is the following:

$$E_u=E_1 \cos \frac{1}{2}\left(K_o \frac{\Delta n}{n_o}\right) Z \quad (17)$$

In operation, signal source 15, which may be a television antenna, generates by means of transducer 25 an acoustic signal of a frequency which may be in the VHF range in medium 24 of sound cell 11. By adjustment of device 39, the structure is tuned to select a particular frequency to be received by receptor 38. At a given setting of device 39 and with the constant wave-length light source 10, receptor 38 receives only that light diffracted by sound waves of the particular wave-length and frequency to which the system is "tuned." The selected signal is demodulated in receptor 38 in essentially the same manner as described in connection with FIGURE 1.

As also explained in connection with the apparatus of FIGURE 1, the power output that may be obtained from receptor 38 for a given cell construction depends only upon the power contained in beam 16 and the amplitude of the sound waves generated in cell 11. With the apparatus of FIGURE 7, it is possible both to select and amplify and incoming signal of frequencies at which it would be impossible or impractical to employ the apparatus of FIGURE 1.

Since, as mentioned above, the undiffracted light passing through cell 11 also varies in amplitude as a function of the input signal, it is possible to position a receptor to sense variations in the undiffracted light path. However, since the amplitude in that path also varies somewhat with diffraction from other-frequency signals impressed on cell 11, this is not as advantageous as the arrangement shown.

FIGURE 8 shows a somewhat different construction for sound cell 11 of FIGURE 7. In this embodiment, fixed diffraction grating 40 is included in cell 11. Grating 40, which as illustrated takes the form of etched lines upon the outer surface of cell 11, diffracts a portion of the undiffracted light of beam 16 which otherwise would pass directly through cell 11. The function of this diffraction grating is to direct into receptor 38 a second beam which is coincident with the sound-cell-diffracted beam but different in frequency from that beam. When light in beam 16 is diffracted by the sound waves of cell 11, a Doppler shift (in the device of FIGURE 7, a negative frequency shift) takes place, and the light so diffracted differs from the incident light in frequency, being less by the frequency of the sound signal diffracting that light. The light diffracted by fixed grating 40, however, since that diffraction does not involve a wave interaction, remains at the original frequency of beam 16. The effect of superimposing the second light beam, one that differs from the other only by the sound signal frequency, is to produce a hetrodyne or homodyne beat frequency effect which may be detected by receptor 38. That is, the received signal amplitude varies by a beat frequency equal to that of the signal impressed by source 15.

The embodiment of FIGURE 8, incorporated in the structure of FIGURE 7 in one preferred application, is a tunable radio frequency (RF) amplifier. The signal source 15 is a television antenna, for example and the output signal at terminals 14 represents the amplified modulated carrier signal of the frequency segment or channel selected by adjustment of device 39. The embodiment, while not detecting or demodulating the received signal, has the advantage of being able to sense and amplify weaker signals. The output signal from terminals 14 of this embodiment may be impressed as the source 15 signal in the embodiments of FIGURES 1 or 7 for further amplification and demodulation. Alternatively, the output signal from terminals 14 may be utilized as the input signal in a conventional television receiver.

FIGURE 9 shows an alternate method of achieving a homodyne effect between modulated and unmodulated light. In this case, a portion of the incident beam 16 is diffracted by sound cell 11 and directed to receptor 38 along axis **38*a*. The undiffracted light of beam 16 continues on to a mirror 41 from which it is reflected along a path 16*a* to a second mirror 42 positioned to direct undiffracted light along a path 16*b* into cell 11 at the positive Bragg angle. A large portion of this light is not diffracted but passes through cell 11 to receptor 38 along axis 38*a*. The light diffracted from this beam is again directed to mirror 41 and thus to mirror 42 and again directed into and through cell 11. A portion of this re-reflected light will likewise be diffracted in cell 11; however, for practical purposes the attenuation of this light is such that its effect may be ignored. The initial light diffracted from the original beam of light is at a frequency equal to the frequency of the light in the original beam minus the sound frequency ($f_1-f_s$). The light diffracted after passing through sound cell 11 for the second time is at a frequency equal to the frequency of the original incident light plus the sound frequency ($f_1+f_s$), having undergone a positive doppler shift since it entered at the positive Bragg angle. The effect of superimposing these modulated signals with the unmodulated light of beam 16 is to achieve homodyne reception at detector 38** with both upper and lower sidebands of the modulating frequency ($f_s$) being present.

Since the conventional photocell that may be incorporated into receptor 38 is a device which is responsive to variation in light amplitude but is insensitive to phase or frequency variation of the sensed light, care must be taken in constructing the device of FIGURE 9 so as to achieve amplitude modulation of the light directed along axis 38*a*. As is well known in carrier modulation theory, the presence of both sidebands and the carrier may result in pure amplitude modulation, pure phase modulation or mixed phase and amplitude modulation of the carrier.

The effect of the upper and lower sidebands upon the output of cell 11 in the device of FIGURE 9 contributes to amplitude modulation rather than phase modulation when the device is constructed to have the light path distance, from cell 11 to mirror 41 to mirror 42 and back to cell 11, satisfying the following formula:

$$d=c/2f_s \qquad (18)$$

where $c$ is the velocity of light in vacuum and $f_s$ is the frequency of the sound signal in cell 11. For a 50 megacycle signal this distance is approximately 3 meters. This length is that distance necessary for the phase relation between the lower and upper sidebands and the carrier to change, as a result of the different propagation constants of the sidebands, to result in amplitude rather than phase modulation. A similar sideband-to-carrier relationship occurs for path distance that are odd integral multiplications of $c/2f_s$. A more general expression of the relationship shown in Equation 16 would be, therefore:

$$d=n\ c/2f_s;\ n=1, 3, 5, \ldots \qquad (19)$$

If the light traveling around path $d$ is attenuated, even to a moderate degree, the amplitude of the sideband generated during the second transit of the undiffracted light becomes smaller than that of the sideband generated the first time. The second-generated sideband then travels the distance $d$ once more and is again attenuated. Under these conditions, only the first-generated sideband is important and the length $d$ is not critical.

When the device of FIGURE 9 is used with the tunable orientation maintaining means 39 described in connection with FIGURES 1 and 7, additional orientation means which may be again a simple mechanical bar-pivot-link apparatus are preferably provided to maintain the beam reflecting and directing mirrors positioned at the proper orientation and distances to maintain the superimposing or homodyning of the beams.

FIGURE 10 depicts apparatus wherein an output signal is taken from a second transducer 43. As a subcombination, FIGURE 10 depicts a demodulator for a modulated light beam. In operation, light 16 enters cell 11 at the Bragg angle $\beta$ and is diffracted with a negative Doppler shift. In the interaction between light beam 16 and the sound generated by transducer 25, energy is transferred to the sound waves at a frequency dependent on the Bragg angle and the frequency of light in beam 16. In quantum-theoretical terms, the energy (E′) of a photon of light is given by the formula $$E'=hf_1 \qquad (20)$$

where $h$ is Planck's constant and $f_1$ is the frequency of the light. The energy contained in the same photon after diffraction in cell 11 is given by the formula $$E'=h(f_1-f_s) \qquad (21)$$

The difference in energy of this photon is a phonon whose energy is given by $$E'_s=hf_s \qquad (22)$$

For every photon of diffracted light a phonon is given to the medium 24 of cell 11. The effect of this light-sound interaction is therefore to amplify the sound signal without shifting its frequency. This amplified signal is impressed on transducer 43 to produce an electrical output at its terminals 44.

The device shown in FIGURE 10 may be converted into an oscillation generator by feeding a portion of the electrical signal from terminals 44 to the input of transducer 25 in phase with the signals from source 15, as indicated by the dotted connections in FIGURE 10. As so constructed the device constitutes a tunable signal generator or oscillator whose frequency is adjustable in steps by altering the value of angle $\beta$. By providing adjustable means coupled to the angle selecting mechanism for maintaining the input derived from terminals 44 in phase, the device constitutes a continuously variable signal generator.

FIGURE 11 illustrates another embodiment of the invention in which, as in FIGURE 10, the output is in the form of an acoustic signal which is converted into an electric signal by transducer 43. In this case two light-sound cells 11*a* and 11*b* are oriented transverse to beam 16 at the Bragg angle corresponding to the frequency of the selected signal from source 15. The first cell 11*a* diffracts, with a negative frequency shift, part of the light from beam 16 into a second beam 49 which is directed toward and into cell 11*b* at the Bragg angle by mirrors 50 and 51. The "beating" of the two beams in cell 11*b* produces therein an acoustic signal of the same frequency generated in the medium of cell 11*a* by transducer 25. This resultant sound signal is translated into an electric signal at terminals 44 by transducer 43.

In operation, an acoustic signal corresponding to the input signal from source 15 is generated in medium 24 of cell 11*a* to develop acoustic or sound waves transverse to beam 16. Cell 11*a* is positioned to diffract part of the light of beam 16 into beam 49 whose frequency is shifted downward by the interaction. Beam 49 is thus modulated by this diffraction with the sound signal generated in cell 11*a*. From cell 11*a*, beam 49 is directed by mirror 50 into a path parallel to that of beam 16 and by mirror 51 into a second cell 11*b*. Both beam 16 and beam 49 enter cell 11*b* at the Bragg angle, one with a positive angle and the other negative. The beams interact in the medium of cell 11 to generate sound waves of the same frequency generated in cell 11*a* by transducer 25. This acoustic signal is converted into an electric output signal at terminals 44 by transducer 43. A primary advantage of this arrangement is that it allows separation of the acoustic input from the acoustic output. With the coherent nature of the laser-obtained light, this distance of separation can be large. In this form, the device can be considered as a light-beam modulator, modulating the diffracted beam with the modulated carrier signal or subcarrier from source 15, and also as a light demodulator in that cell 11*b* produces an acoustic and then an electric signal corresponding to the modulated carrier signal.

It is conceivable, and may be desirable for transmission purposes, to transmit only the modulated light beam 49 and to generate another beam of the original beam (16) frequency at the receiver (cell 11*b*) as a substitute for beam 16. In this case, the system is analogous to suppressed-carrier-type radio broadcastng. It will be recognized that the subcombination of cell 11*b* with its two input beams 16 and 49 constitutes a heterodyne detector of light-carried signals.

The light-sound interaction process described in the above embodiments is essentially a parametric process which does not involve the dissipation of power, even though such dissipation may unavoidably occur in the form of optical and acoustical transmission losses. Therefore, the inventive apparatus not only has the capability of producing high gains and of being tunable to selected frequencies, but it is also capable of accomplishing these ends with the low noise performance characteristic of parametric devices.

The various embodiments illustrated have all been discussed in detail in connection with a particular type of cell for achieving light-sound interaction. In FIGURE 1, for example, the primary emphasis was upon the function of cell 11 in serving as a variable-diffraction grating. As pointed out subsequently, however, cell 11 also functions as a device to shift the light frequency. In this respect, and particularly with regard to the combinations and subcombinations in FIGURES 7–11 insofar as they pertain to systems for homodyne or heterodyne interaction between light beams having different modulations and/or frequencies, the invention contemplates the use for cell 11 of any electro-responsive device capable of shifting the light frequency in response to a comparatively lower frequency signal or vice-versa. In this vein, the use herein of "sound" to denominate, for example, the signals from source 15 is not restricted to a frequency range audible or near audible to the human ear. It instead is used only to denote a comparative difference from the extremely high frequency of light and embraces, for example, signals at least well into the VHF, UHF and microwave range.

While particular embodiments of the present invention have been shown and described, it is apparent that changes and modifications may be made therein without departing from the invention in its broader aspects. The aim of the appended claims, therefore, is to cover all such changes and modifications as fall within the true spirit and scope of the invention.

I claim:

1. A demodulator comprising:
means for producing a beam containing waves of spatially coherent substantially monochromatic light;
a variable diffraction grating responsive to an applied signal and having a grating constant proportional to the frequency of said signal;
means for applying a plurality of modulated carrier signals, of different carrier frequencies, to said diffraction grating;
means for selecting a desired order of light diffracted by said grating at a diffraction angle corresponding to a particular one of said carrier signals; and
means for detecting the intensity of the light of said selected order.

2. A demodulator in accordance with claim 1 in which:
said plurality of carrier signals are frequency modulated,
in which there is included means for dividing the selected light into two separate parts, and
a pair of photocells individually responsive to said separate parts and having output circuits coupled in push-pull.

3. A demodulator in accordance with claim 2 in which:
said photocells are fed in common with operating current of substantially a constant value.

4. A demodulator comprising:
means for producing a beam containing waves of spatially coherent substantially monochromatic light;
a medium through which said beam is passed conductive of acoustic waves across said beam to create a diffraction grating corresponding to the pattern of said acoustic waves in said medium;
a transducer responsive to a modulated carrier signal for developing acoustical wave energy;
an acoustical amplifier responsive to said transducer for amplifying and disseminating directly into said medium said acoustical wave energy to develop said acoustic waves;
means for applying a plurality of modulated carrier signals, of different carrier frequencies, to said transducer;
means for selecting a desired order of light diffracted by said grating at a diffraction angle corresponding to a particular one of said carrier signals; and
means for detecting the intensity of the light of said selected order.

5. A demodulator comprising:
means for producing a beam containing waves of spatially coherent substantially monochromatic light;
a variable diffraction grating responsive to an applied signal and having a grating constant proportional to the frequency of said signal;
means for applying a modulated carrier signal of predetermined bandwidth to said diffraction grating;
means receptive to light diffracted by said grating of an order other than zero for concentrating the light to a focus;
means defining a slit located approximately at said focus and of a size for selecting diffracted light of a desired single order, said size being of a value corresponding to said predetermined bandwidth; and
means for detecting the intensity of the light of said selected order.

6. A demodulator comprising:
means for producing a beam containing waves of spatially coherent substantially monochromatic light;
a variable diffraction grating responsive to an applied signal and having a grating constant proportional to the frequency of said signal;
means for applying a plurality of modulated carrier signals, of different carrier frequencies, to said diffraction grating;
means receptive to light diffracted by said grating of an order other than zero for concentrating the light to a focus;
means defining a slit located approximately at said focus and of a size for selecting diffracted light of a desired order, said slit being movable relative to said grating to select light at a diffraction angle corresponding to a particular one of said carrier signals; and
means for detecting the intensity of the light of said selected order.

7. A demodulator comprising:
means for producing a beam containing waves of spatially coherent substantially monochromatic light;
a variable diffraction grating responsive to an applied signal and having a grating constant proportional to the frequency of said signal;
means for applying a plurality of modulated carrier signals, of different carrier frequencies, to said diffraction grating;
means for selecting an order of light diffracted by said grating and effectively pivotable relative to the center of said grating to select a desired order corresponding to a particular one of said carrier signals; and
means for detecting the intensity of the light of said selected order.

8. A demodulator comprising:
means for producing a beam containing waves of spatially coherent substantially monochromatic light;
a variable diffraction grating responsive to an applied signal and having a grating constant proportional to the frequency of said signal;
means, including an element defining an aperture of predetermined size through which light emerging from said grating is passed, for producing a Gaussian distribution of intensity of said light within said aperture;
means for selecting a desired order of light diffracted by said grating; and
means for detecting the intensity of the light of said selected order.

9. A signal-translating apparatus comprising:
means for producing a beam containing waves of spatially coherent substantially monochromatic light;
a light-sound interaction cell, including means for applying an acoustic modulated carrier signal to said cell, positioned to intercept said beam at the Bragg angle and responsive to an applied acoustic signal for producing Bragg diffraction of at least part of said beam, said diffraction being proportional to said applied acoustic signal;

means for sensing variations in the light diffracted at the Bragg diffraction angle from said cell;

means for maintaining said beam producing means, said acoustic signal applying means and said light sensing means in spatial and angular relation to each other for diffracting said beam and sensing variations in said diffracted light for any preselected particular Bragg angle within a predetermined range of angles; and means for varying said maintaining means for changing the relative angular orientation of said beam producing means, said acoustic signal applying means and said light sensing means while maintaining Bragg diffraction.

10. A signal-translating apparatus comprising:

means for producing a first beam containing waves of spatially coherent substantially monochromatic light;

a medium positioned in the path of said first beam, substantially transparent to light, and conductive of acoustic waves;

means responsive to a signal for generating acoustic waves in said medium across the path of said beam the wave fronts of said acoustic waves being positioned at the Bragg diffraction angle to said beam for diffracting part of said beam into a second beam;

means for super-imposing part of said first beam upon and along the path of said second beam; and means for sensing variations in the combined amplitude of said super-imposed beams.

11. A signal-translating apparatus comprising:

means for producing a first beam containing waves of spatially coherent substantially monochromatic light;

a medium position in the path of said first beam, substantially transparent to light, and conductive of acoustic waves;

means responsive to a signal for generating acoustic waves in said medium across the path of said first beam, the wave fronts of said acoustic waves being positioned at the Bragg diffraction angle to said first beam for diffracting at least part of said first beam into a second beam;

means for reflecting and directing the undiffracted light from said first beam in a path coincidental with the path of said diffracted light and super-imposing said undiffracted light upon said diffracted light; and means for sensing variations in the combined amplitude of said super-imposed light.

12. A signal-translating apparatus comprising:

means for producing a first beam containing waves of spatially coherent substantially monochromatic light;

a medium positioned in the path of said first beam; substantially transparent to light, and conductive of acoustic waves;

means responsive to a signal for generating acoustic waves in said medium across the path of said first beam to diffract at least part of said first beam into a second beam;

means incluaing a fixed diffraction grating for diffracting part of the undiffracted light from said first beam into a third beam with a path coincidental with the path of said second beam; and means for sensing variations in the combined amplitude of said second and third beams.

13. A signal-translating apparatus comprising:

means for producing a beam containing waves of spatially coherent substantially monochromatic light:

means for directing across the path of said beam sound waves of variable frequency having wave-fronts diffractive of said light and the orientation of which relative to said path is variable to present said wave-fronts to said beam at the Bragg angle, corresponding to the wavelengths of said light and sound, and to vary said angle substantially in correspondence with changes in the frequency of said sound waves.

References Cited

UNITED STATES PATENTS 3,297,876 1/1967 De Maria ----------- 332—251

OTHER REFERENCES

Adler, "IEEE Spectrum," May 1967, pp. 42–54.

JOHN KOMINSKI, *Primary Examiner.*

D. R. HOSTETTER, *Assistant Examiner.*

U.S. Cl. X.R.

250—199; 307—88.3; 329—110, 135, 144, 192; 330—4.5, 5.5; 331—66, 107, 177; 332—7.51; 333—30, 73; 350—161, 162